United States Patent
Aoyagi et al.

(10) Patent No.: US 11,559,896 B2
(45) Date of Patent: Jan. 24, 2023

(54) FAILURE PREDICTION SYSTEM

(71) Applicant: FANUC CORPORATION, Yamanashi (JP)

(72) Inventors: Takahiro Aoyagi, Yamanashi (JP); Norio Takei, Yamanashi (JP); Shinji Kurihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 319 days.

(21) Appl. No.: 16/908,450

(22) Filed: Jun. 22, 2020

(65) Prior Publication Data

US 2021/0023708 A1 Jan. 28, 2021

(30) Foreign Application Priority Data

Jul. 25, 2019 (JP) .............................. JP2019-137222

(51) Int. Cl.
*B25J 9/16* (2006.01)
*B25J 13/08* (2006.01)

(52) U.S. Cl.
CPC ........... *B25J 9/1674* (2013.01); *B25J 13/085* (2013.01)

(58) Field of Classification Search
CPC .... B25J 9/1674; B25J 13/085; B25J 19/0095; B25J 9/1633; B25J 19/06; G05B 2219/42311; G05B 2219/24033; G05B 2219/32371; G05B 2219/33315; G05B 2219/37214; G05B 2219/37253; G05B 2219/50185; G05B 2219/37246; G05B 2219/40599; G05B 2219/43092
See application file for complete search history.

(56) References Cited

U.S. PATENT DOCUMENTS

| | | | |
|---|---|---|---|
| 9,393,693 B1* | 7/2016 | Kalakrishnan | B25J 9/1671 |
| 2018/0133901 A1* | 5/2018 | Kuno | G01L 5/0061 |
| 2019/0217468 A1* | 7/2019 | Ogata | B25J 9/1633 |
| 2021/0129346 A1* | 5/2021 | Nagasaka | B22C 9/108 |

FOREIGN PATENT DOCUMENTS

JP  2006-285884 A  10/2006

* cited by examiner

*Primary Examiner* — Abby Y Lin
*Assistant Examiner* — Esvinder Singh
(74) *Attorney, Agent, or Firm* — Studebaker & Brackett PC

(57) ABSTRACT

A failure prediction system includes: a processor, the processor being configured to: collect torque values of a drive axis of a robot that is operating in accordance with a given work program; derive an evaluation formula approximating a time change of the torque value which is most recent from among the collected torque values set a failure threshold that is the torque value at which it is determined that failure of the drive axis occurs, based on the evaluation formula and the time change of the torque value when the drive axis reached failure in the past; and calculate an estimated value for the torque value when a prediction time set in advance has elapsed in the evaluation formula, and determines whether failure of the drive axis is predicted within the prediction time according to comparison between the estimated value and the failure threshold.

5 Claims, 3 Drawing Sheets

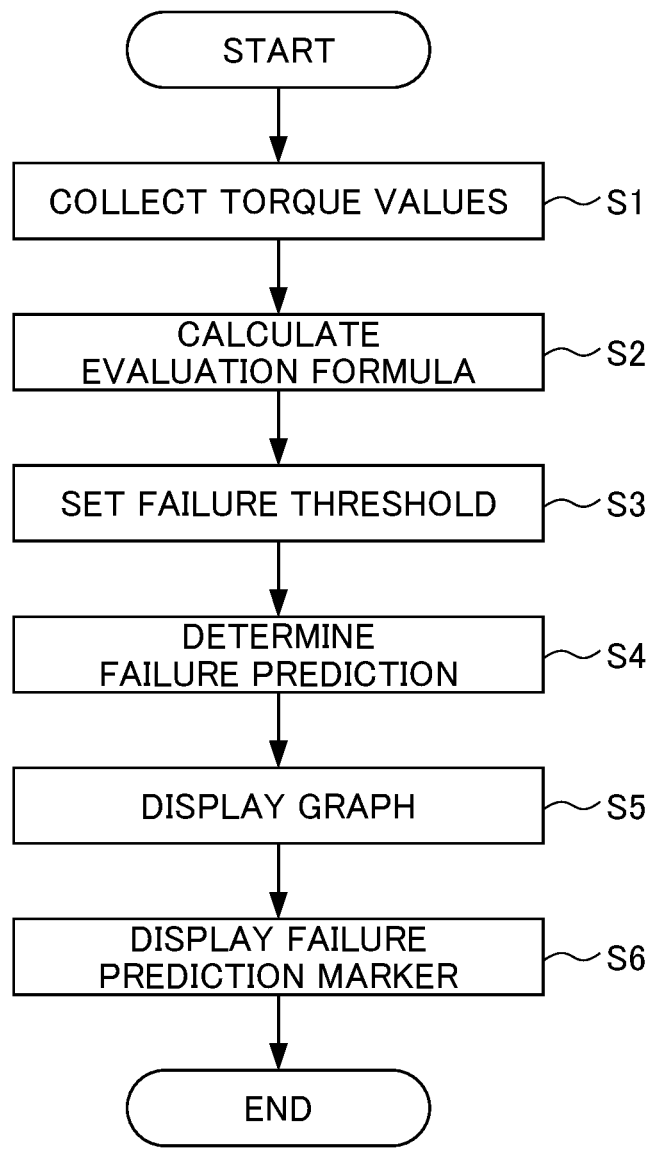

FAILURE PREDICTION SYSTEM

This application is based on and claims the benefit of priority from Japanese Patent Application No. 2019-137222, filed on 25 Jul. 2019, the content of which is incorporated herein by reference.

BACKGROUND OF THE INVENTION

Field of the Invention

The present invention relates to a failure prediction system.

Related Art

Technology has been desired which can predict the failure of a robot, i.e. detect a symptom of failure of the robot, and notify a user before it is no longer possible to operate properly. Generally, it has been known that the drive torque during operation increases when there is failure of the robot. Therefore, it has been proposed to predict failure by monitoring for a change in drive torque or the like. For example, Patent Document 1 discloses technology which implements failure diagnosis according to the size relationship between the measurement value and reference value of a sensor group such as a torque sensor, temperature sensor and acceleration sensor.

Patent Document 1: Japanese Unexamined Patent

SUMMARY OF THE INVENTION

The extent of increase in drive torque until the robot reaches failure, and the drive torque during failure occurrence differ according to the operation pattern of the robot. For this reason, with a method which compares a current measurement value with a reference value as disclosed in Patent Document 1, there is a possibility of determining that failure is near irrespective of the life expectancy of the robot being long. For this reason, a failure prediction system which can accurately predict the failure of a robot, irrespective of the operation pattern of the robot, has been desired.

A failure prediction system according to an aspect of the present disclosure includes: a torque value collection unit which collects torque values of a drive axis of a robot that is operating in accordance with a given work program; an evaluation formula derivation unit which derives an evaluation formula approximating a time change of the torque value which is most recent from among the torque values collected by the torque value collection unit; a threshold setting unit which sets a failure threshold that is the torque value at which it is determined that failure of the drive axis occurs, based on the evaluation formula and the time change of the torque value when the drive axis reached failure in the past; and a prediction determination unit which calculates an estimated value for the torque value when a prediction time set in advance has elapsed in the evaluation formula, and determines whether failure of the drive axis is predicted within the prediction time according to comparison between the estimated value and the failure threshold.

According to the present invention, it is possible to accurately predict failure of a robot.

BRIEF DESCRIPTION OF THE DRAWINGS

FIG. 4 is a flowchart showing the flow of control by the failure prediction system in FIG. 1.

DETAILED DESCRIPTION OF THE INVENTION

Figure 1:
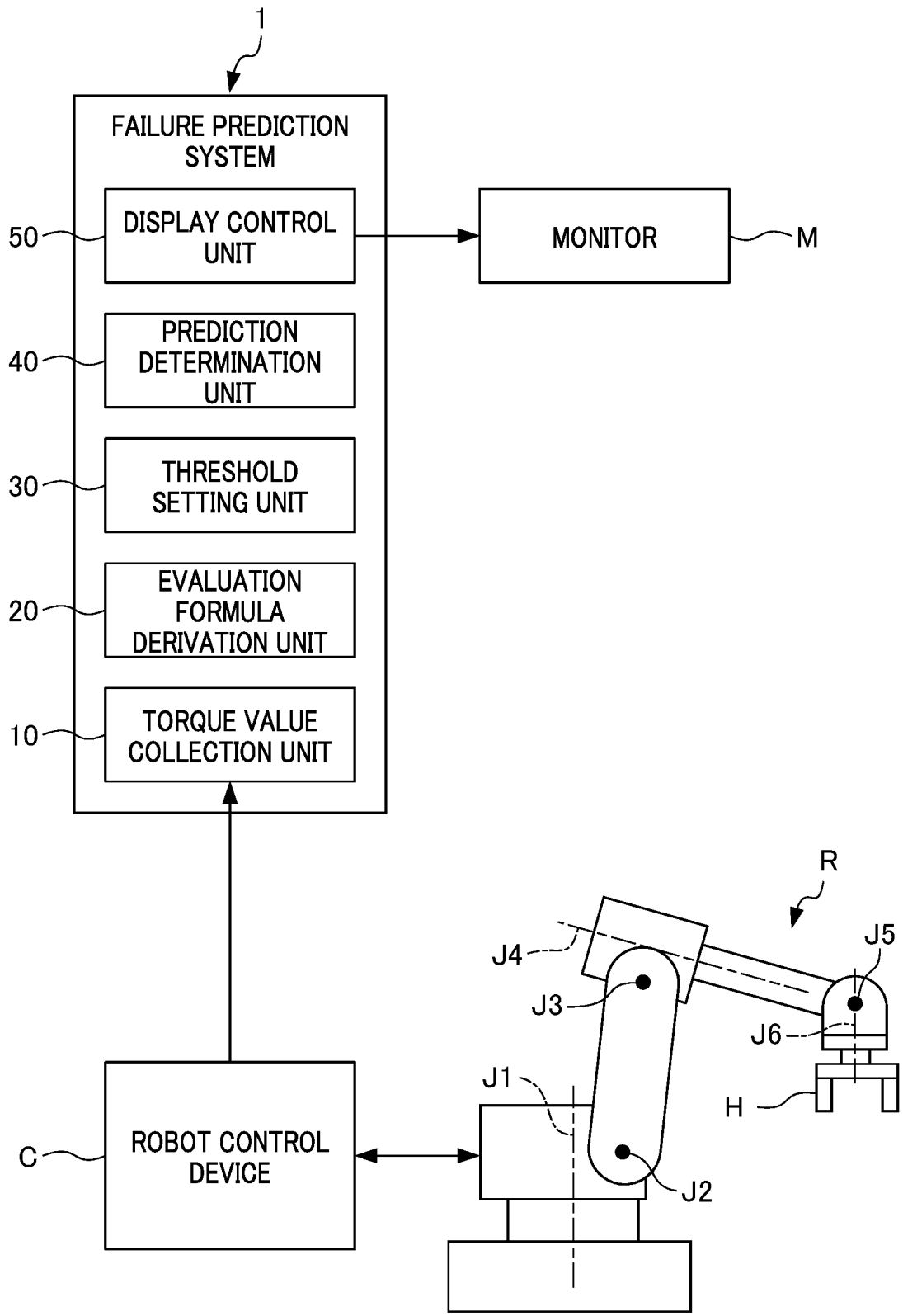
FIG. 1 is a block diagram showing the configuration of a robot system equipped with a failure prediction system of an embodiment of the present disclosure.

Hereinafter, an embodiment of the present disclosure will be explained while referencing the drawings. FIG. 1 shows the configuration of a robot system equipped with a failure prediction system 1 according to an embodiment of the present disclosure.

The robot system includes: a robot R, a robot control device C which controls the robot R, a failure prediction system 1 which communicates with the robot control device C, and a monitor M for which the display contents are controlled by the failure prediction system 1.

The robot R has a plurality of drive axes J1, J2, J3, J4, J5, J6, and a hand H capable of holding a workpiece is provided to a leading end thereof, for example. The robot R can perform a desired operation by causing the hand H to move by way of driving of the drive axes J1 to J6. The robot R can be established as a vertical articulated robot as shown, but is not limited thereto, and may be a Cartesian coordinate robot, SCA RA robot, parallel link robot, etc. The robot R is established as a configuration having a torque detection unit which detects the torque values of each drive axis J1 to J6 (e.g., torque, electrical current value, etc. of motor driving the drive axis).

The robot control device C causes the robot R to operate in accordance with a given operating program. More specifically, the robot control device C calculates the position or speed at every time of each drive axis J1 to J6 of the robot R required in order to perform operation in accordance with a machining program, and can be established as a known configuration which applies the necessary electrical current to the respective drive axes J1 to J6 of the robot R. In addition, the robot control device C receives the feedback signal of the drive torque of each drive axis J1 to J6 from the robot H, and sends a torque value of each drive axis J1 to J6 to the failure prediction system.

The monitor M can be configured by a display device such as a liquid crystal display panel, for example. The monitor M may be attached to the failure prediction system 1, may be attached to the robot, control device C, or may be provided at a location distanced from the failure prediction system 1 and robot control device C, e.g., position which can be seen from many locations in the factory in which the robot R is installed.

The failure prediction system 1 includes: a torque value collection unit 10 which collects the torque values of the drive axes J1 to J6 of the robot R; an evaluation formula derivation unit 20 which derives an evaluation formula that approximates the rime change of the latest torque value; a threshold setting unit 30 which sets a failure threshold that is a torque value at which it is determined that failure of the drive axes J1 to J6 occurs; prediction determination unit 40 which determines whether failure of any of the drive axes J1 to J6 is predicted within a prediction time; and a display control unit 50 which displays a torque value and determination results of the prediction determination unit 40 on the monitor M.

The failure prediction system 1, for example, can be configured by realizing the appropriate control program in a computer device having a CPU, memory, communication interface, etc. The torque value collection unit 10, threshold setting unit 30, prediction determination unit 40 and display control unit 50 are distinguished functionally, and may not necessarily be clearly distinguishable in the mechanical configuration and program configuration. Communication between the failure prediction system 1 and robot control device C can be performed via a network or dedicated communication line.

The torque value collection unit 10 collects a time series of torque values of the drive axes J1 to J6 of the robot R operating in accordance with the work program, from the robot control device C. In other words, the torque value collection unit 10 stores the value at every time of the drive torque of each of the plurality of drive axes J1 to J6.

In addition, the torque value collection unit 10 may receive a signal specifying an work program being executed or a signal notifying of a change in the work program, from the robot control device C, reset the torque values collected during a change in work program, and collect new torque values. Since it is thereby possible to configure so as not to reflect the torque value during execution of an work program differing from the work program currently being executed in failure prediction, it is possible to accurately predict failure of the drive axes J1 to J6 at the current operating conditions of the robot R.

Figure 2:
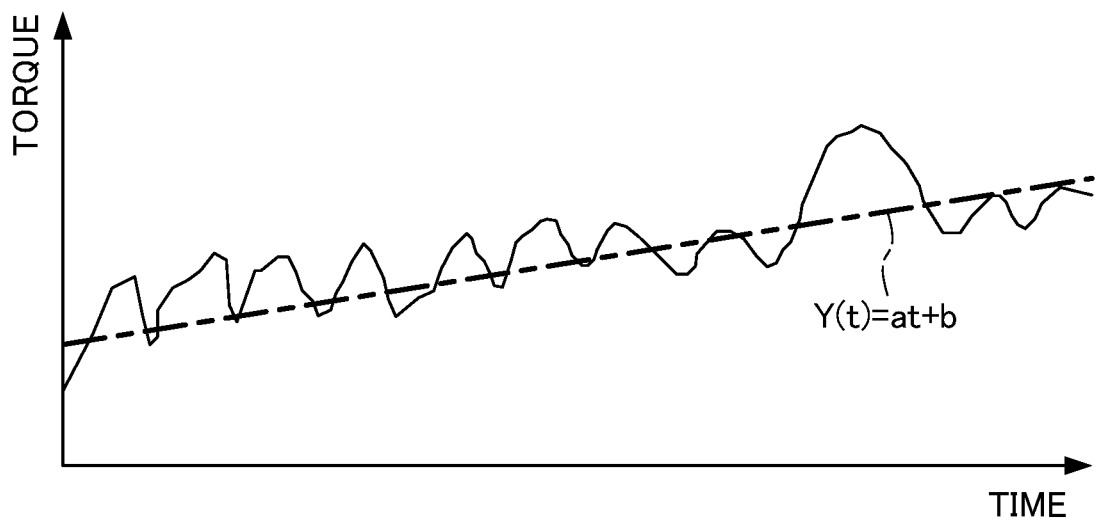
FIG. 2 is a graph illustrating an evaluation formula of a torque value in the failure prediction system of FIG. 1.

The evaluation formula derivation unit 20 derives, for every drive axes J1 to J6, an evaluation formula approximating the time change in torque value of the drive axes J1 to J6 of the robot R operating in accordance with the latest (within a fixed time range up to present) work program from among torque values collected by the torque value collection unit 10. As an example, as shown in FIG. 2, the evaluation formula derivation unit 20 can use a linear function $Y(t)=at+b$ (a, b are constants) shown by the dot-dashed line, as the evaluation formula approximating the time change of the actual torque value shown by the solid line. In other words, the evaluation formula derivation unit 20 calculates the values of the constants a, b such that the evaluation formula $Y(t)=at+b$ becomes a formula representing the actual torque value.

The threshold setting unit 30 sets the failure threshold, which is a torque value at which determining that failure of the drive axes J1 to J6 occurs, for every drive axis J1 to J6, based on the time change of the torque value when the drive axes J1 to J6 failed in the past, and the evaluation formula approximating the time change of the latest torque value of the drive axes J1 to J6. The value of b in the evaluation formula $Y(t)$ changes depending on the latest torque value collected by the torque value collection unit 10; therefore, it is possible to set the appropriate failure threshold.

For this reason, the threshold setting unit 30 stores the time change of torque value when the drive axes J1 to J6 failed in the past. The torque value when failing in the past may use the torque values collected by experiment or the like, or may be a copy of torque values collected for the same type of robot R. The torque value when failing in the past differs from the latest torque value of the torque value collection unit 10, and is saved without being erased also during change of the work program.

The threshold setting unit 30 of the present embodiment calculates for every drive axis J1 to J6 the operation time until the drive axis J1 to J6 fails, and the torque value at this time, and calculates the average value ts at the operating time until reaching failure, and the average value $\tau$ and standard deviation $\sigma$ of the torque value during failure occurrence. Next, the threshold setting unit 30, taking consideration of the average value $\tau$ and standard deviation $\sigma$ of the torque value during failure occurrence, decides for every drive axis J1 to J6 a safety factor K, which is a constant calculated as a ratio of the torque value at which it can be determined as having a high possibility of failure occurring (for example, torque value during actual failure occurrence which is a value arrived at by subtracting two times the standard deviation from the average value) relative to the average value.

In addition, the threshold setting unit 30 may be configured so as to store the average value ts of the operation time until reaching failure calculated in advance and the safety factor K, without actually performing computation of the average value ts of the operation time until reaching failure, etc. In this case, the threshold setting unit 30 may not necessarily store the torque value when reaching failure in the past.

The threshold setting unit 30 sets, as the failure threshold, a value arrived at by multiplying the safety factor K by the torque value $Y(ts)$ obtained by assigning the average value is of the operation time until reaching failure at time t of this evaluation formula $Y(t)=at+b$.

The prediction determination unit 40 calculates an estimated value for the torque value when a prediction time set in advance has elapsed, using the evaluation formula $Y(t)$ based on the time change of the latest torque value derived by the evaluation formula derivation unit 20. Then, the prediction determination unit 40 compares the estimated value and failure threshold, and determines that failure of the drive axes J1 to J6 is predicted in the case of the estimated value being at least the failure threshold.

Figure 3:
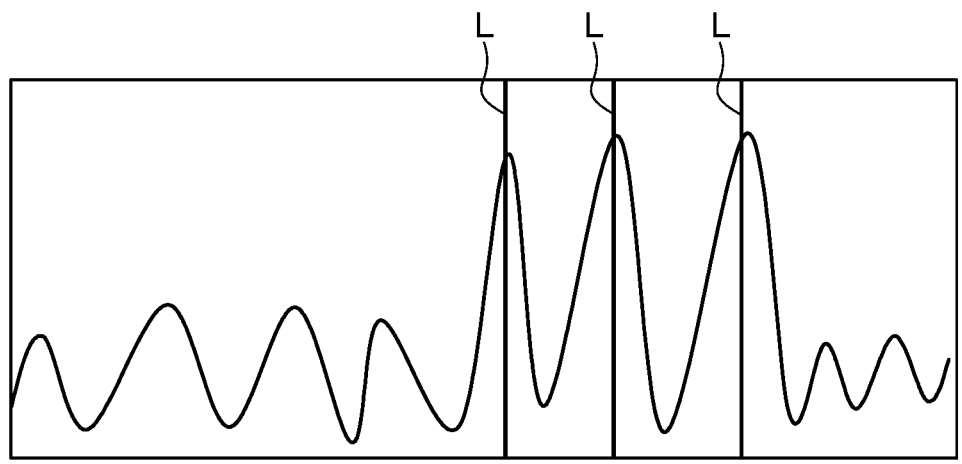
FIG. 3 is a view illustrating a display by a display control unit of the failure prediction system in FIG. 1.

The display control unit 50, as shown in FIG. 3, displays the latest torque value as a graph on the screen on the monitor M, and in the case of the prediction determination unit 40 determining that failure of the drive axes J1 to J6 is predicted, displays this event using a marker or the like. It is thereby possible to notify the user of the event that failure is predicted. The display method of the marker about failure being predicted, as shown, may be established as a method displaying a line L indicating the time of the last torque value when the prediction determination unit 40 determined that the failure of the drive axes J1 to J6 was predicted, on the graph of the torque values. This line L is preferably displayed in a color (for example, red, etc.) which stands out more than the line plotting the torque value.

FIG. 4 shows the sequence of failure prediction by the failure prediction system 1. The failure prediction by the failure prediction system 1 includes: a step of collecting torque values of the drive axes J1 to J6 (Step S1); a step of deriving the evaluation formula approximating the latest torque value (Step S2); a step of setting the failure threshold based on the evaluation formula and torque value when reaching failure in the past (Step S3); a step of determining whether failure is predicted within the prediction time based on the evaluation formula and failure threshold (Step S4); a step of displaying the torque values on a time-series graph (Step S5); and a step of displaying, in a case of failure being predicted, the end time of the torque value serving as the basis for this determination, by a line on the graph (Step S6).

Due to deriving an evaluation formula showing the change in torque values of the drive axes J1 to J6 by operation of the robot P in accordance with the work program currently being executed, and setting the failure threshold using this evaluation formula, the failure prediction system 1 can set the appropriate failure threshold made by reflecting the degree of wear on the drive axes J1 to J6 in the current operation of the robot R. In addition, due to comparing the torque values of the drive axes J1 to J6 after the prediction time with the failure threshold based on the evaluation formula, the failure prediction system 1 can suppress variation in grace time from when determining that failure is predicted until an actual failure occurs. In this way, the failure prediction system according to the present disclosure can relatively accurately predict failure of the robot R.

Although an embodiment of the present disclosure has been explained above, the present invention is not limited to the aforementioned embodiment. In addition, the effects described in the present embodiment are merely listing the most favorable effects produced from the present invention, and the effects from the present invention are not limited to those described in the present embodiment.

In the failure prediction system according to the present disclosure, the evaluation formula derivation unit may approximate the time change of the actual torque value, by way of a multi-order function, exponential function, or a combination thereof.

In the failure prediction system according to the present disclosure, the display control unit may display the time of the last torque value when the prediction determination unit determined that failure of the drive axis was predicted by a method other than a line, for example, a method such as an arrow mark, or text indicating the time.

In addition, in the failure prediction system according to the present disclosure, the display control unit is any configuration, and is sufficient so long as able to enable confirmation of determining that failure is predicted by another means. As an example, the failure prediction system according to the present disclosure may be established as a system having a configuration which records or externally outputs an event of the prediction determination device determining that failure is predicted, in place of the display control unit.

EXPLANATION OF REFERENCE NUMERALS

1 failure prediction system
10 torque value collection unit
20 evaluation formula derivation unit
30 threshold setting unit
40 prediction determination unit
50 display control unit R robot
J1, J2, J3, J4, J5, J6 drive axis

What is claimed is:

1. A failure prediction system comprising:
a processor, the processor being configured to:
collect torque values of a drive axis of a robot that is operating in accordance with a given work program;
derive an evaluation formula approximating a variation of the torque value which is most recent from among the collected torque values;
set a failure threshold that is the torque value for determining occurrence of failure of the drive axis based on the evaluation formula and the variation of the torque value observed when the drive axis reached failure in the past; and
calculate, with the evaluation formula, an estimated torque value at a time when a prediction time set in advance has elapsed, and determines whether failure of the drive axis is predicted within the prediction time according to comparison between the estimated torque value and the failure threshold.

2. The failure prediction system according to claim 1, wherein the processor defines, as the failure threshold, a value arrived at by multiplying a constant decided based on the time change of the torque value when the drive axis reached failure, by a value arrived at by substituting into the evaluation formula a time decided based on the time change of the torque value when the drive axis reached failure in the past.

3. The failure prediction system according to claim 1, wherein the processor resets the torque values collected, during a change of the work program, and then newly collects the torque values.

4. The failure prediction system according to claim 1, wherein the processor displays the torque value that is most recent on a graph, and in a case of the processor determining that failure of the drive axis is predicted, displays an indicator thereof.

5. The failure prediction system according to claim 4, wherein the processor displays, on the graph, a line indicating a time of the torque value that is last when the processor determines that failure of the drive axis is predicted.

* * * * *